United States Patent [19]

Dassen

[11] 4,240,904

[45] * Dec. 23, 1980

[54] PROCESS FOR BIOLOGICAL PURIFICATION OF WASTE WATER

[75] Inventor: Bernardus H. N. Dassen, Kerkrade, Netherlands

[73] Assignee: Stamicarbon, B.V., Geleen, Netherlands

[*] Notice: The portion of the term of this patent subsequent to Feb. 26, 1997, has been disclaimed.

[21] Appl. No.: 54,434

[22] Filed: Jul. 3, 1979

Related U.S. Application Data

[62] Division of Ser. No. 917,359, Jun. 20, 1978, Pat. No. 4,190,528.

[30] Foreign Application Priority Data

Jun. 27, 1977 [NL] Netherlands ................... 7707081

[51] Int. Cl.³ .......................................... C02F 11/14

[52] U.S. Cl. ................................. 210/609; 426/807; 210/613

[58] Field of Search ...................... 55/52–54; 71/12; 210/2–10, 12, 15, 18, 42 R, 45, 51–53, 56, 48; 426/807

[56] References Cited

U.S. PATENT DOCUMENTS

| 3,522,173 | 7/1970 | Lindman et al. | 210/53 |
| 3,622,507 | 11/1971 | Pasveer | 210/12 |
| 4,038,180 | 7/1977 | Talbert | 210/51 |

FOREIGN PATENT DOCUMENTS 2042785  3/1972  Fed. Rep. of Germany ............. 210/53

Primary Examiner—Peter A. Hruskoci
Attorney, Agent, or Firm—Cushman, Darby & Cushman

[57] ABSTRACT

Process for the biological purification of waste water in which a suspension of the surplus sludge formed during the purification is hydrolyzed in a basic medium and at elevated temperatures.

8 Claims, 2 Drawing Figures

PROCESS FOR BIOLOGICAL PURIFICATION OF WASTE WATER

This is a division of application Ser. No. 917,359, filed June 20, 1978, now U.S. Pat. No. 4,190,528.

BACKGROUND AND SUMMARY OF THE INVENTION

The present invention relates to a new and novel process for the biological purification of waste water in which an aqueous suspension of the surplus sludge formed during the purification is hydrolyzed in a basic medium and at an elevated temperature.

A similar process is disclosed in Netherlands patent application No. 6,911,163. According to this application the sludge formed is hydrolyzed with the aid of sodium hydroxide or, possibly, calcium oxide. The resulting solid matter which consists essentially of inorganic salts and water-insoluble organic substances such as cell walls which are not, or only partly, hydrolyzed, is filtered off and subjected to further processing. The hydrolysate, which consists essentially of an aqueous solution of mostly organic material and sodium salts, is returned to the purification plant. Although this process produces a great improvement in the disposal of sludge from a water water purification plant, it has disadvantages.

One disadvantage is if sodium hydroxide is used for hydrolysis of sludge. In that event, the hydrolysate will contain large quantities of sodium ions. During subsequent processing of the hydrolysate, which consists essentially of an aqueous solution of amino acids, oligopeptides and hydrolysis products of carbohydrates and fats, these sodium ions present problems. The basic amino acids are the commercially important components of the hydrolysate. If these are to be recovered from the hydrolysate by means, for example, of selective ion exchange, all sodium ions must be removed first.

Another disadvantage is at the temperature and pH applied for the hydrolysis, racemization of the amino acids and peptides may occur. This causes a mixture of D- and L-amino acids to form which is less attractive economically when used, for example, as cattle feed. There is not much point in adding such a mixture of D- and L-amino acids to human food, since D-amino acids have no value as building material. Addition of a considerable amount of D-amino acids is not permitted by law. The only possible alternative is to return it to the waste water purification plant which results in increased investment variable costs.

Moreover, from an environmental consideration, a process of this kind is not attractive anyway because all of the sodium hydroxide used is discharged into the surface water in the form of sodium salts. This causes an extra consumption of chemicals because the hydrolysate, prior to being returned to the plant, must first be neutralized. The pH value and the quantity of liquid are such that interference with the action of the biologically active microorganisms may also occur.

The purpose of the invention is to provide a process in which these disadvantages do not occur.

The process according to the present invention is carried out by giving the suspension of the sludge a pH value of between about 8 and about 11 and carrying out the hydrolysis in the presence of a volatile base at a temperature of between about 90° and about 300°. The base is removed from the hydrolysate formed after the hydrolysis has been terminated. By preference, ammonia or a bound form thereof, such as ammonium carbonate, is used as the volatile base. The ammonia that has been removed from the hydrolysate is returned to the hydrolysis stage. The hydrolysis is, preferably, carried out at a temperature of between about 90° and about 200° C.

DESCRIPTION OF THE INVENTION

The process of the present invention has several significant advantages over known processes. One advantage is that since, at the pH value applied, practically no racemization of amino acids occurs, a hydrolysate is obtained which consists essentially of the amino acids and oligopeptides which occur naturally.

Surprisingly, applicant has discovered that it is possible to hydrolyze microorganisms with the aid of a weak volatile base like ammonia. Normally, such hydrolysis is carried out with a strong base, such as sodium hydroxide, for the very reason that the high pH values, i.e., about 13 and higher, necessary for hydrolysis of the organic substances present can thereby be achieved. According to the present invention, alkaline hydrolysis of biologically activated sludge is, unexpectedly, possible at a pH value of about 8.

The process according to the present invention has the significant advantage over the known process in that it entails practically no extra costs for chemicals. The volatile base used, for example, ammonia is recovered by stripping the liquid, e.g, with air or with the aid of steam. The base can then be reused. Without much difficulty, the residual content of ammonia can be reduced to 10 ppm after the stripping. If sodium hydroxide or calcium oxide is used, new chemicals must continually be supplied. This adds a heavy financial burden to the waste water purification. Moreover, it may be necessary first to neutralize the hydrolysate before it can be used further.

It is preferred that, after the solid matter and the volatile base have been separated off, the hydrolysate be further processed to produce economically attractive products. For example, one or more of the amino acids present may be recovered with the aid, for example, of selective ion exchange or crystallization. In addition, it is possible to recover aromatic nitrogen bases. Particularly important are those bases which are based on pyrimidines and/or purines. These originate from inter alia the genetic material of the microorganisms in the sludge. Another application of the hydrolysate may be to process it into cattle feed. In other cases, it may be best to use the hydrolysate as a carbon source in the denitrification step of an industrial waste water purification plant, possibly after one or more nitrogen compounds have been separated off. In addition, the hydrolysate may also be mixed with the fresh waste water and be passed through the entire plant during which, contrary to the known process, no disturbance of the pH equilibrium in the plant occurs. However, return of the hydrolysate to the waste water purification plant is only possible if the waste water purification process is one in which nitrogen compounds are also removed. Otherwise an unacceptable amount of nitrate will be present in the treated waste water which is discharged to the surface water.

The process according to the process invention can be practiced at the usual pressures for handling aqueous $NH_3$ solutions. Preferably, the pressure will range between about 1 and about 50 atm abs. The concentration of ammonia and/or ammonium carbonate will range, preferably from about 2 N to about 14 N.

It is possible to carry out the hydrolysis under such conditions that complete or partial deamination of the amino acids present occurs. In the case of a return of the hydrolysate to the waste water purification plant this complete or partial deamination has the advantage that a substantially smaller nitrogen load occurs. For deamination to be achieved it is necessary to work at higher temperatures and $NH_3$ concentrations; for example, a temperature above about 150° C. and a concentration of between about 4 and about 14 N $NH_3$. If it is not intended to deaminate, it is preferable to work at temperatures of between about 90° and about 180° C. and at an $NH_3$ concentration of between about 2 and about 6 N $NH_3$.

The sludge suspension to be hydrolyzed contains, depending on the type of plant of origin from, varying concentrations of sludge, i.e., dry matter. This may vary between less than about 1% by weight and to more than about 35% by weight.

DESCRIPTION OF THE DRAWINGS

Figure 1:
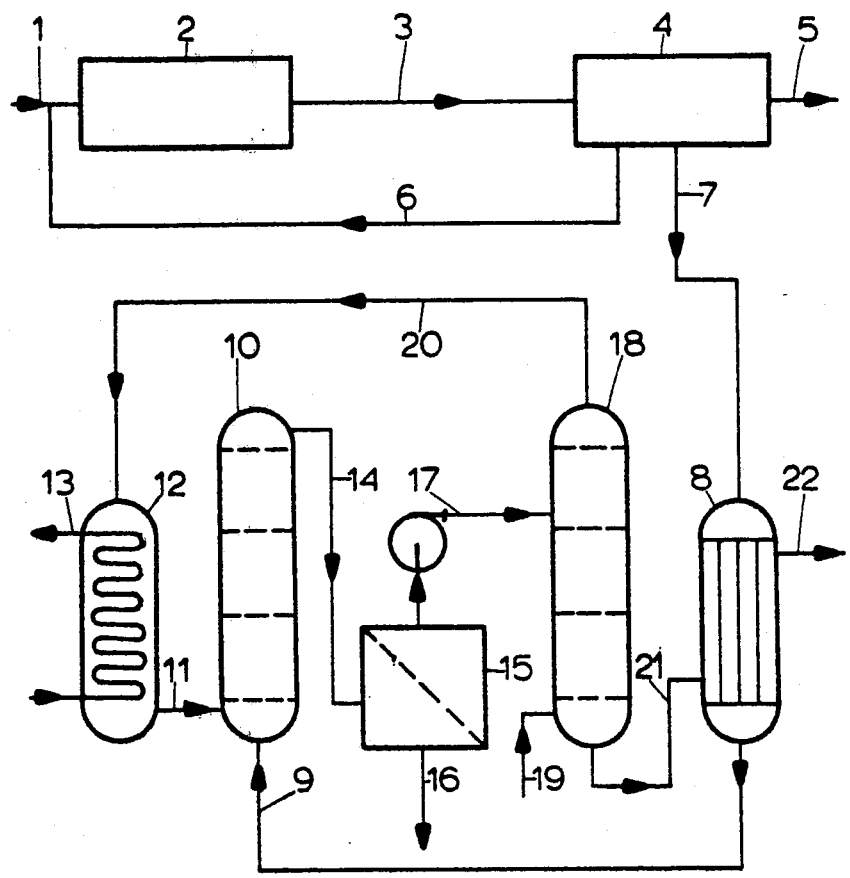
FIG. 1—Diagram of a possible embodiment of the process according to the invention.
Figure 2:
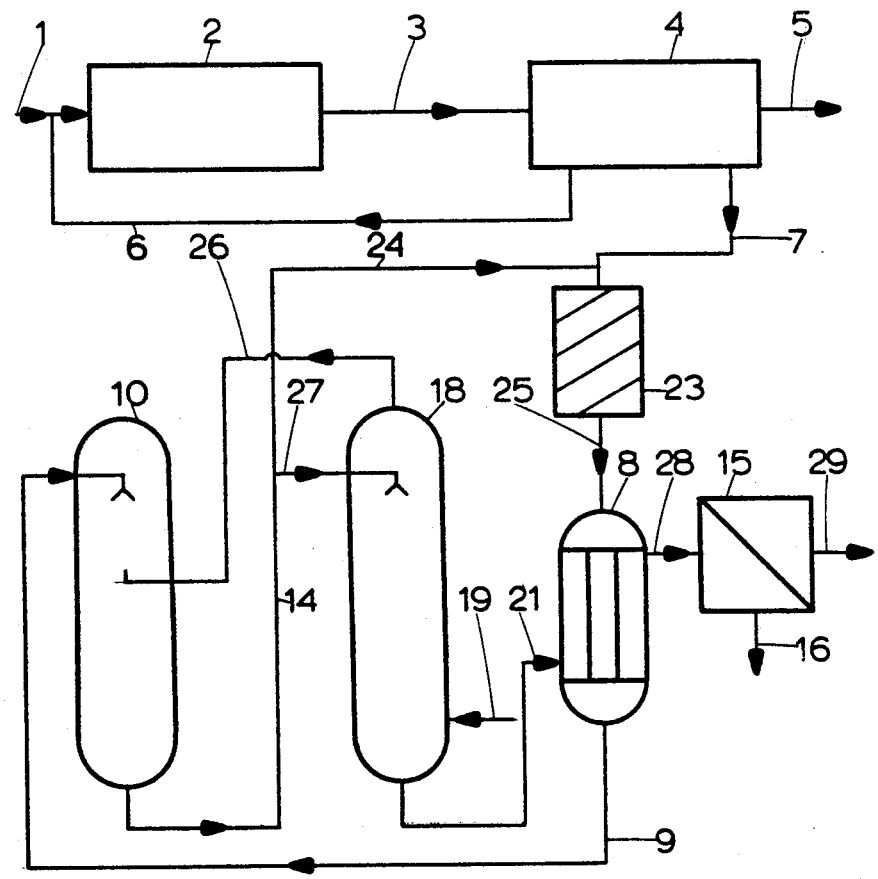
FIG. 2—Diagram of another possible embodiment of the process according to the invention.

Possible embodiments of the process according to the present invention are described with the aid of the FIGS. 1 and 2, but are not limited thereto.

FIG. 1 shows a diagram of a process for purification of waste water according to the invention. Waste water enters via line 1 into a biological purification plant 2. Depending on the kind of waste water, the design of this plant will be more or less, complicated. The purified waste water, which contains suspended biologically activated sludge, is fed through line 3 to section 4, where the sludge settles and thickens. Purified water is discharged via line 5 into surface water of for further treatment with, for instance, chlorine. A sludge suspension from section 4 is recycled via line 6 to the biological purification plant. A concentrated sludge suspension is passed via line 7 to heat exchanger 8. The heated suspension is fed via line 9 into hydrolysis column 10. A gas mixture of $NH_3$ and steam originating in heater 12 is supplied to hydrolysis column 10 via line 11.

In the heater 12 the mixture of $NH_3$ and steam is heated with the aid of a steam coil 13. The hydrolyzed sludge suspension leaves hydrolysis column 10 via line 14. In filtration equipment 15, which may for example, consist of either filters, sieve bends or centrifuges, this suspension is split up into a hydrolysate and a solid matter. The solid matter is discharged via line 16. The hydrolysate proceeds through line 17 to desorption column 18. In column 18 the $NH_3$ is desorbed with the aid of steam which is introduced, via line 19, into desorption column 18 directly. The desorbed $NH_3$, together with a quantity of steam, is recycled to heater 12 via line 20. The hydrolysate leaves via line 21 desorption column 18. After heat exchange with the suspension from settling basin 4 in heat exchanger 8, the hydrolysate is discharged via line 22.

FIG. 2, in which the various reference numbers have the same meaning as in FIG. 1, shows another embodiment of the process according to the invention.

Waste water here enters biological purification plant 2 via line 1. The purified waste water, which contains suspended activated sludge, is led through line 3 to section 4, where the sludge settles and thickens. Via line 5 purified water is discharged. Via line 6 part of the sludge suspension from section 4 is recycled to the purification plant. Via line 7 a concentrated sludge suspension is led to static mixer 23, in which this suspension is mixed with hydrolyzed sludge that is supplied through line 24. The mixture is passed to heat exchanger 8 via line 25.

The heated suspension is led into hydrolysis column 10 via line 9. Via line 26 a steam/$NH_3$ mixture is led into hydrolysis column 10. Via line 7 the treated sludge suspension is discharged. Part of this suspension is mixed with the sludge suspension from section 4, another part is supplied to desorption column 18 via line 27. Via line 19 the steam required for the desorption and the hydrolysis is supplied.

Via line 21 the hydrolyzed sludge suspension is discharged. After heat exchange in heat exchanger 8 the suspension is led into filtration equipment 15 via line 28 and separated into solid matter, which is discharged via 16, and liquid, which is discharged via 29.

The invention will be further elucidated with the aid of a few examples, but is not limited thereto.

EXAMPLES

Example 1

Waste water from a chemical complex was supplied to a plant substantially as described in the FIG. 1. During the purification of the waste water 32.0 tons/h of sludge suspension was produced, which was discharged from section 4 via line 6. The sludge suspension contained about 20% of sludge, i.e., dry matter, about 75% of which was inorganic material and about 25% organic material. The organic material consisted essentially of micro-organisms and these principally contained amino acids, carbohydrates and fats in a ratio of about 5 : about 4 : about 1. This suspension was hydrolyzed in hydrolysis column 10 with the aid of about 2 tons/h of $NH_3$ and steam at a temperature of about 130° and a pressure of about 6 ats g. The hydrolyzed sludge was separated, in 15, into about 2.4 tons/h of solid matter and about 35.6 tons/h of hydrolysate which contained about 0.8 ton/h of organic material and about 32.8 tons/h of water. The solid matter contained about 90% of the heavy metals which were present in the sludge suspension. The hydrolysate was treated in desorption column 18 with steam of about 15 atm g., all $NH_3$ escaping and being recycled via line 20. Ultimately, about 39.0 tons/h of hydrolysate, about 0.8 ton of which was organic material, was discharged via line 23.

Example 2

Waste water from a chemical complex is supplied to a plant as described in FIG. 2. During the purification of the waste water 275 tons/day of sludge suspension is produced, which is discharged from section 4 via line 7. The sludge suspension contains 20% of sludge (dry matter), approximately 75% of which is inorganic material and approximately 25% organic material. The organic material mainly consists of micro-organisms and these principally contain amino acids, carbohydrates and fats in a ratio of 5:4:1. This suspension is hydrolyzed in hydrolysis column 10 with the aid of 56.8 tons/day of $NH_3$/steam mixture at a temperature of 130° C. and a pressure of 10 ats abs. The hydrolysate is treated in desorption column 18 with steam of 10 atm abs, all NH₃ and part of the steam escaping and being recycled via line 20. The hydrolyzed sludge is separated in 15 into 37.5 tons/h of solid matter and 296.7 tons/day of hydrolysate, which contains 17.5 tons/day of organic material and 279.2 tons/day of water. The solid matter contain 90% of the heavy metals that were present in the sludge suspension.

Example 3

A number of tests were carried out on a laboratory scale in which aqueous sludge suspensions from a biological purification plant were hydrolyzed in basic medium. 100 ml of a 10% sludge suspension in water was hydrolyzed in a basic medium for a certain time at a variable temperature. The results are shown in the table. The chemical oxygen demand (COD) which is a measure of the hydrolysis of the biologically active sludge is given in the last column.

| test No. | medium | reaction in time (hours) | reaction temperature (°C.) | COD mg/g solid |
|---|---|---|---|---|
| 1 | 4n NH₃ | 3/2 | 130 | 320 |
| 2 | 4n NH₃ | 3/2 | 150 | 310 |
| 3 | 4n NH₃ | 3/2 | 180 | 280 |
| 4 | 2 moles/l (NH₄)₂CO₃ | 3/2 | 130 | 300 |
| 5 | H₂O | 3/2 | 100 | 38 |
| 6 | Ba(OH)₂ | 36 | 100 | 120 |
| 7 | CaO | 48 | 100 | 54 |
| 8 | H₂O | 3/2 | 150 | 120 |
| 9 | Standard (HCl hydrolysis) | — | — | 310 |

This table clearly indicates that the sludge is almost completely hydrolyzed with NH₃ or (NH₄)₂CO₃. It can also be seen that at more severe reaction conditions the COD content becomes lower, which indicates deamination.

Example 4

It was determined that amino acids were present in the hydrolysate obtained in test 1 of Example 3. The quantities are given in milligrams.

| | |
|---|---|
| aspariginic acid | 10.9 |
| threonine | 3.9 |
| serine | 3.1 |
| glutaminic acid | 10.3 |
| glycine | 6.9 |
| alanine | 6.9 |
| valine | 6.4 |
| leucine | 6.4 |
| tyrosine | 2.7 |
| phenylalanine | 4.1 |
| isoleucine | 3.5 |
| lysine | 5.2 |
| histidine | 1.5 |
| arginine | 1.4 |
| total amino acids | 83.2 mg |

At a sludge production rate of 32.0 tons/h as in Example 1, this would result in an amino acid quantity of about 24 kg/h.

What is claimed is:

1. Process for biological purification of waste water, in which a suspension of the activated sludge formed during the purification is hydrolyzed in a basic medium and at an elevated temperature, said process being conducted by giving the suspension a pH of between about 8 and about 11 and carrying out the hydrolysis in the presence of a volatile base selected from the group consisting of ammonia and ammonium carbonate at a temperature of between about 90° C. and about 300° C., to obtain a hydrolysate containing at least one of naturally occurring amino acids or oligopeptides, desorbing at least a portion of the hydrolyzed sludge suspension to expel said volatile base, returning said volatile base to adjust said pH, and separating said hydrolysate from said suspension.

2. Process of claim 1 wherein the hydrolysis is carried out at a temperature of between about 90° and about 200° C.

3. Process of claim 1, wherein one or more N compounds are recovered from the hydrolysate formed.

4. Process of claim 3, wherein the hydrolysate formed is fully or partly processed to cattle feed.

5. Process of claim 4, wherein the hydrolysate formed is returned to the biological purification after the solid matter has been separated off.

6. Process of claim 4, wherein the volatile base is stripped from the hydrolysate with an inert gas or gas mixture.

7. Process of claim 1 or 4, wherein the process is carried out under conditions at which deamination occurs.

8. Process of claim 7, wherein the hydrolysis is carried out at a temperature of between about 150° and about 300° C. and an NH₃ concentration of between about 4 and about 14 N.

* * * * *